(12) United States Patent
Taylor

(10) Patent No.: US 6,911,062 B1
(45) Date of Patent: Jun. 28, 2005

(54) FILTER ASSEMBLY UTILIZING DUAL FILTER ELEMENTS AND A PRESSURE RESPONSIVE MEMBER TO PROVIDE DIFFERENTIAL PRESSURE ACTUATED SWITCHOVER

(75) Inventor: Julian S. Taylor, Oklahoma City, OK (US)

(73) Assignee: Taylor Innovations, L.L.C., Oklahoma City, OK (US)

( * ) Notice: Subject to any disclaimer, the term of this patent is extended or adjusted under 35 U.S.C. 154(b) by 0 days.

(21) Appl. No.: 10/295,217

(22) Filed: Nov. 15, 2002

(51) Int. Cl.[7] .............................. B01D 29/52; F01N 3/02
(52) U.S. Cl. ...................... 55/385.1; 55/385.3; 95/19; 95/278; 95/283; 96/417; 96/421; 96/422; 96/423; 251/30.02; 251/30.03
(58) Field of Search ........................... 55/385.1, 385.3, 55/DIG. 34; 95/278, 283, 19; 251/30.02, 30.03; 96/417, 421, 422, 423

(56) References Cited

U.S. PATENT DOCUMENTS

| 5,234,031 A | | 8/1993 | Pickett et al. | |
|---|---|---|---|---|
| 5,616,157 A | * | 4/1997 | Mead et al. | ........... 55/DIG. 34 |
| 5,858,224 A | * | 1/1999 | Schwandt et al. | ............ 96/421 |
| 5,972,075 A | * | 10/1999 | Fukuda et al. | ................ 96/421 |
| 5,996,608 A | | 12/1999 | Hunter et al. | |
| 6,090,187 A | * | 7/2000 | Kumagai | ..................... 95/278 |
| 6,096,224 A | * | 8/2000 | Champie | ..................... 96/421 |
| 6,405,746 B2 | | 6/2002 | Harms et al. | |
| 6,457,697 B1 | | 10/2002 | Kolze | |
| 6,585,791 B1 | * | 7/2003 | Garito et al. | ................. 96/421 |

* cited by examiner

Primary Examiner—Minh-Chau T. Pham
(74) Attorney, Agent, or Firm—Fellers, Snider, et al.

(57) ABSTRACT

Method and apparatus for filtering contaminants from a pressurized fluid. First and second filter elements are arranged within a housing to receive a flow of pressurized fluid. Respective first and second portions of the flow are directed through the filter elements and impinge opposing sides of a piston member which is biased in a first position by a collapsible pressure responsive member, such as a buckling pin. So long as the differential pressure across the first filter element is below a selected threshold, the first portion of the flow passes through an outlet of the housing and the second portion of the flow is blocked. Once sufficient contaminants have been captured by the first filter element, however, the resulting increase in differential pressure causes a collapse of the pressure responsive member. This moves the piston to a second position and directs the second portion of the flow to the outlet.

13 Claims, 5 Drawing Sheets

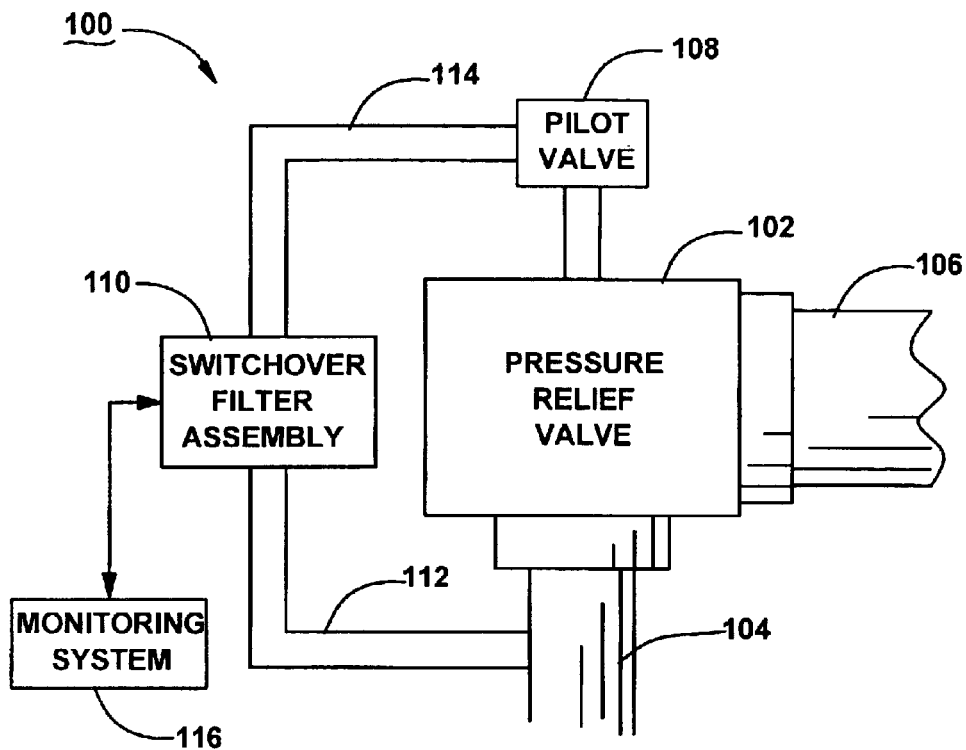
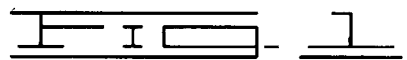
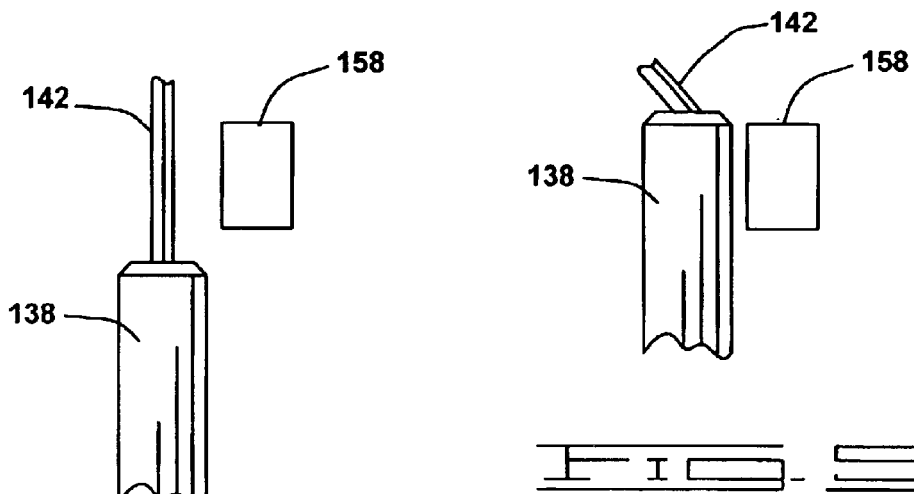
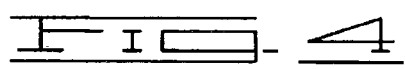
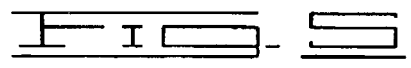

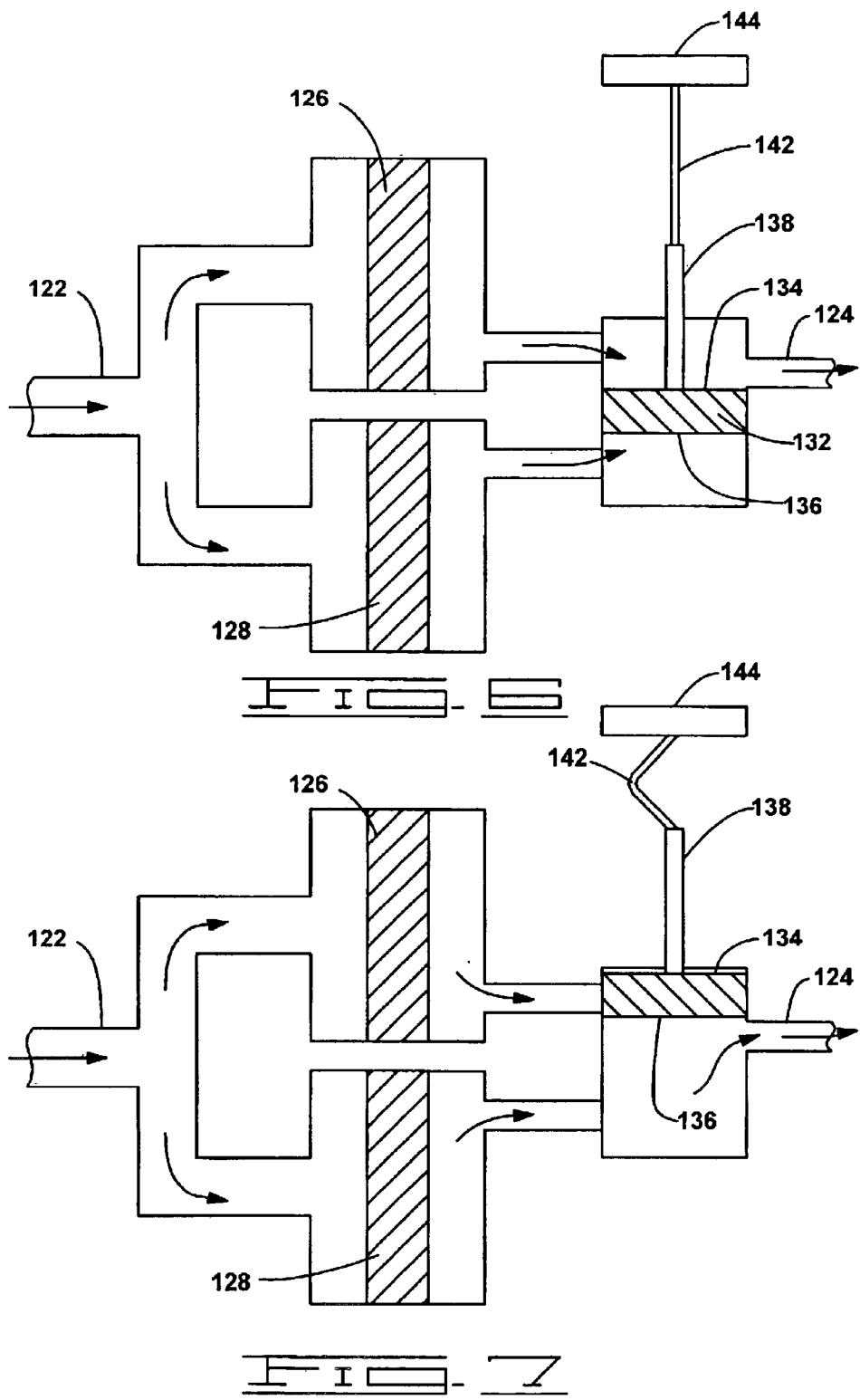

FILTER ASSEMBLY UTILIZING DUAL FILTER ELEMENTS AND A PRESSURE RESPONSIVE MEMBER TO PROVIDE DIFFERENTIAL PRESSURE ACTUATED SWITCHOVER

FIELD OF THE INVENTION

This invention relates generally to the field of pressurized fluid systems and more particularly, but not by way of limitation, to a system and method for filtering a fluid using first and second filter elements and a pressure responsive member such as a collapsible buckling pin. Generally, the first element collects fluid-borne contaminants from the fluid until a differential pressure across the first element increases to a point at which the pressure responsive member collapses, resulting in the switching over to the second filter element.

BACKGROUND

It is often desirable to filter fluid-borne contaminants from the flow of a pressurized fluid. For example, filtering is often advantageously employed in a fuel line that delivers a combustible fuel to an engine combustion chamber, as the presence of contaminants in the combusted fuel can adversely affect engine performance.

Another application where filtering is sometimes employed is in a pressure relief system used to sense and relieve over pressure conditions in a transported fluid. A commonly employed pressure relief system configuration such as exemplified by U.S. Pat. No. 6,457,697 issued to Kolze utilizes a main valve assembly to provide a bypass path for the pressurized fluid.

The main valve is actuated by a pilot valve assembly which employs a number of small, precisely sized orifices to permit controlled flow of a portion of the fluid. An upstream filtering screen removes fluid-borne contaminants from the fluid to prevent clogging of the orifices, since a partially or fully blocked orifice can detrimentally affect operation of the main valve assembly.

Regardless of the application, it is often difficult to gauge the effectiveness of a particular filtering system at any given time. In systems that employ replaceable filter elements, it is common to periodically replace the elements on a scheduled basis. To be effective, such an approach typically requires rigorous human intervention which can be subject to variations and oversights.

Moreover, depending upon the application, contaminant levels in fluids can change over time. Thus, a particular filter element may fill to capacity and thereafter provide insufficient filtering long before the next scheduled replacement.

There is therefore a continued need for improvements in the filtering of fluid-borne contaminants from a fluid, and it is to such improvements that the present invention is directed.

SUMMARY OF THE INVENTION

The present invention is generally directed to a method and apparatus for filtering contaminants from a pressurized fluid.

In accordance with preferred embodiments, a filter assembly includes a housing having an inlet and an outlet. The inlet receives a flow of unfiltered pressurized fluid, and the outlet correspondingly outputs a flow of filtered pressurized fluid.

First and second filter elements are disposed within the housing to receive respective first and second portions of the inlet flow and to capture fluid-borne contaminants therefrom.

A piston member is disposed within the housing between the first and second filter elements and includes opposing first and second piston surfaces. The first portion of the flow passes from the first filter element to impinge upon the first piston surface, and the second portion of the flow passes from the second filter element to impinge upon the second piston surface.

A collapsible pressure responsive member, such as a buckling pin, is coupled to the piston member and biases the piston member in a first position. The collapsible pressure responsive member receives an axially directed force in relation to a pressure differential across the first filter element. The pressure differential is determined in relation to an accumulated amount of the contaminants captured by the first filter element.

At the commencement of operation, both filter elements will preferably be in a pristine condition, so that the pressure drops across both elements will be nominal and substantially equal. At this point the first portion of the flow passes from the piston member to the outlet and the second portion of the flow is blocked by the piston member.

Over time, contaminants will accumulate in the first filter element, increasing the pressure differential across the first filter element. So long as this differential is insufficient to collapse the pressure responsive member, the first portion of the flow will continue to be directed to the outlet. However, once the differential pressure increases to a level sufficient to collapse the pressure responsive member, the piston member moves to a second position. This blocks further flow of the first portion and allows the second portion of flow to be directed to the outlet.

The collapse of the pressure responsive member provides a visual indication that the first filter element has achieved a selected contamination level and has been switched out of operation in favor of the second filter element. This allows maintenance personnel to schedule the replacement of the first filter element without jeopardizing ongoing operation of the system.

As desired, a proximity sensor can be employed to generate an electrical signal upon collapse of the pressure responsive member. This electrical signal can be provided to a monitoring system employing a programmable computer or similar equipment to provide an indication of the status of the system to attending personnel.

The filter assembly adaptively adjusts to changes in contaminant levels in the fluid. Thus, if contaminant levels remain low, the elapsed time until switchover occurs will be relatively long. On the other hand, high contaminant levels will result in a reduced time to switchover. In either case, the first filter element is switched out of the system at a predetermined contaminant level before the element has reached its full capacity, thus preventing the use of a clogged, ineffective filter element.

The filter assembly further adaptively accommodates wide variations in fluid pressures, since the differential pressure across the first filter element will remain substantially unaffected by such variations.

These and various other features and advantages which characterize the claimed invention will be apparent from a reading of the following detailed description and a review of the associated drawings.

BRIEF DESCRIPTION OF THE DRAWINGS

FIG. 1 is a functional block diagram of a pressure relief system constructed and operated in accordance with preferred embodiments of the present invention.

FIGS. 4 and 5 show a buckling pin support post of the filter assembly in conjunction with a proximity sensor to indicate whether the assembly is operating in the first or second operational modes.

FIGS. 6 and 7 provide schematics view of the filter assembly in accordance with another preferred embodiment.

DETAILED DESCRIPTION

Figure 2:
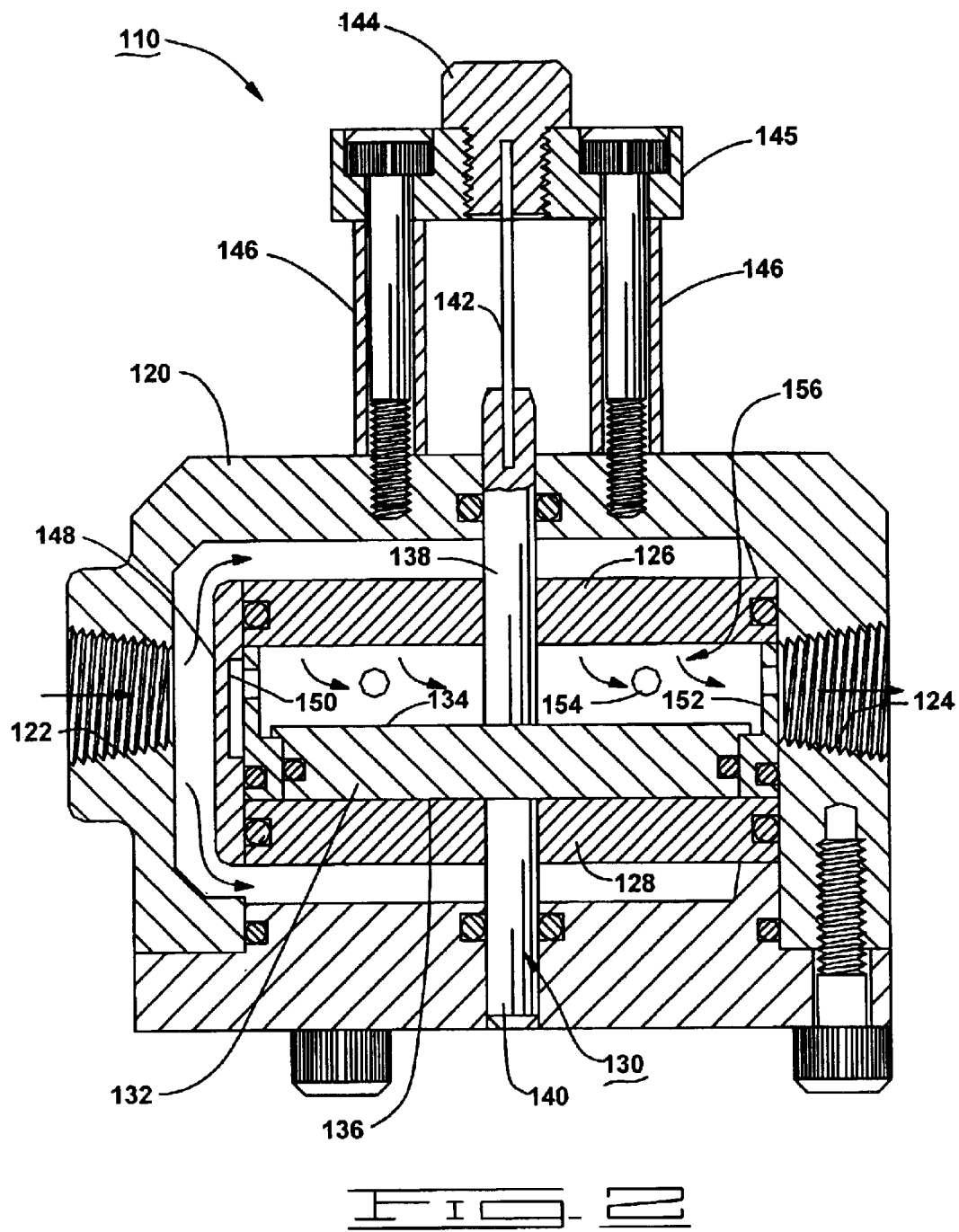
FIG. 2 is an elevational, cross-sectional view of a dual filter element switchover filter assembly of the system of FIG. 1 in a first operational mode.

To provide an illustrative environment in which preferred embodiments of the present invention can be advantageously practiced, FIG. 1 shows relevant portions of a pressure relief system 100 in which a pressurized fluid is transported. The system 100 includes a pressure relief valve 102 (main valve) used to establish a bypass path for the fluid from an inlet conduit 104 to an outlet conduit 106.

The main valve 102 is activated by a pilot valve 108, which employs a diaphragm or similar means to sense an overpressure condition in the fluid. The pilot valve 108 further employs one or more small orifices with a precisely sized diameter (such as 1/16 inch) through which a portion of the fluid flows during operation.

A switchover filter assembly 110 filters fluid from an inlet conduit 112 and provides filtered fluid to the pilot valve 108 via conduit 114. As explained below, the filter assembly 110 further preferably communicates with a monitoring system 116 to provide a continuous status of the filter assembly to attending personnel.

FIG. 2 is an elevational, cross-sectional view of a preferred construction for the filter assembly 110. The filter assembly 110 includes a housing 120 with an inlet port 122 and an outlet port 124. With reference again to FIG. 1, the inlet port 122 lies in fluidic communication with the conduit 112, and the outlet port 124 is provided in fluidic communication with the conduit 114.

Opposing first and second filter elements 126, 128 are disposed within the housing 120 as shown. The filter elements preferably comprise metal mesh screens configured to capture fluid-borne contaminants of a selected size equal to or smaller than the diameter of the orifices in the pilot valve 108. The particular construction and configuration of the filter elements, of course, can vary widely depending upon the requirements of a given application.

A piston assembly 130 disposed within the housing 120 includes a centrally disposed piston member 132 with opposing surfaces 134, 136 which are oriented in respective, facing relationships to the first and second filter elements 126, 128. Top and bottom support posts 138, 140 project from the respective surfaces 134, 136 and serve to support and guide the piston member 132 during movement within the housing 120.

The support posts 138, 140 project through corresponding apertures (not numerically designated) in the filter elements 126, 128. The clearance dimensions between the sidewalls of the apertures and the posts 138, 140 are selected such that the posts can freely slide through, the apertures while at the same time restricting the passage of contaminants along the gaps between the posts and the aperture sidewalls.

Figure 3:
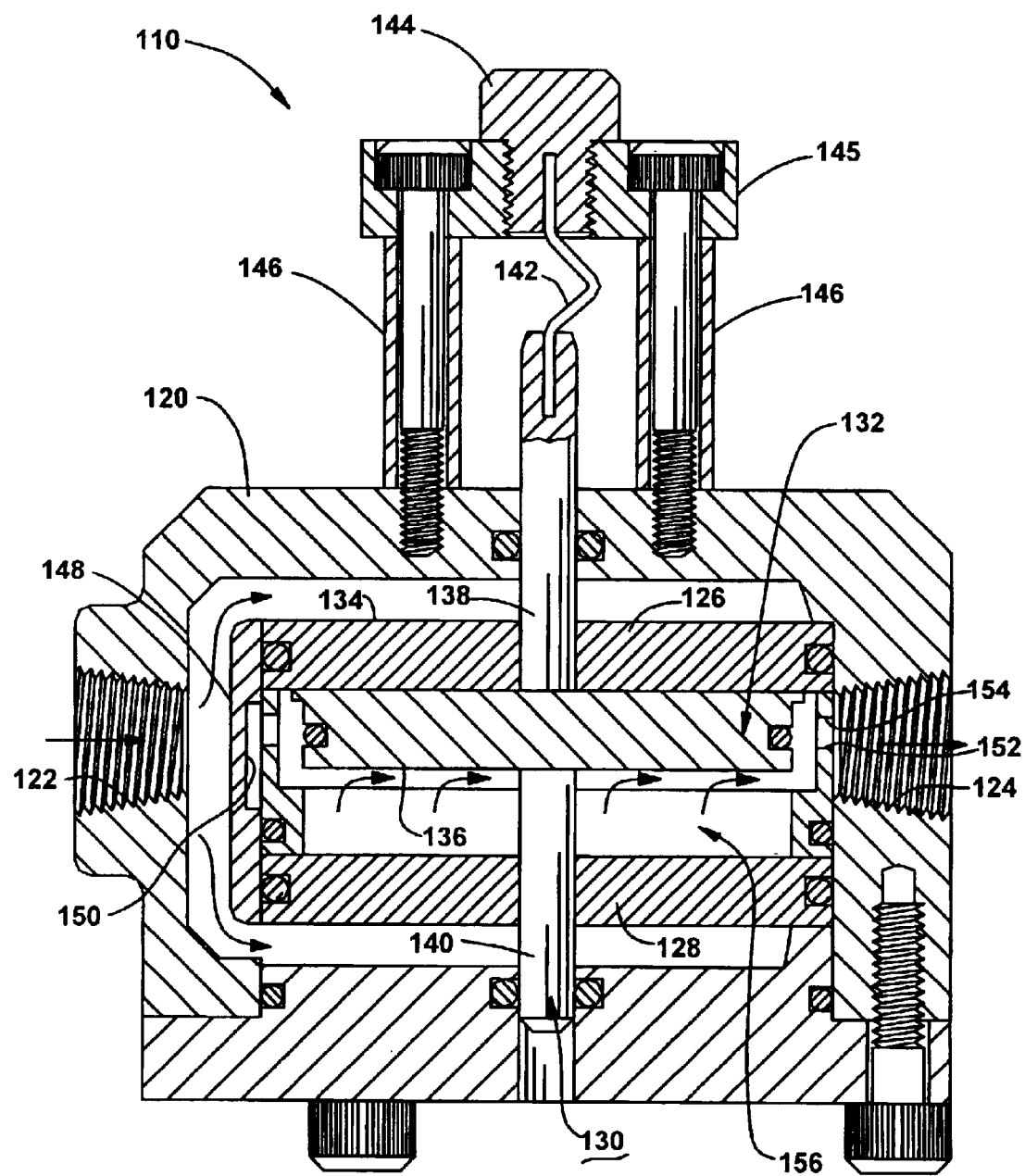
FIG. 3 is an elevational, cross-sectional view of the filter assembly of FIG. 2 in a second operational mode.

The top post 138 (hereinafter also referred to as the "pin support post") supports and captures a proximal end of a pressure responsive member 142. A holding nut 144 and a flange 145 are supported above the housing 120 via standoffs 146 to support and capture a distal end of the pressure responsive member 142. The pressure responsive member 142 is preferably characterized as a buckling pin, although other configurations can readily be used including a shear pin or frangible disk. As will be recognized, a buckling pin provides very precise mechanical deformation characteristics in response to axial compression along the length of the pin, and will buckle (fail) as shown in FIG. 3 when a predetermined axial compression force is reached.

The first and second filter elements 126, 128 are supported within the housing 120 by a circumferentially extending diverter sidewall 148 with an inwardly facing annular recess 150. A circumferentially extending piston seat 152 is disposed within the sidewall 148. The piston seat 152 includes apertures 154 that align with the annular recess 150. The sidewall 148, piston seat 152 and filter elements 126, 128 cooperate to form an interior chamber 156 within the housing 120.

The piston member 132 is configured to slidingly move up and down within this interior chamber 156 from a first position (FIG. 2) to a second position (FIG. 3), and is normally biased in the first position by the pressure responsive member 142. Fluidic ingress into the interior chamber 156 can only nominally occur by passage of the fluid through one of the filter elements 126, 128.

As shown in FIG. 2, during operation a flow of pressurized fluid enters the housing 120 through inlet port 122. The flow is diverted across the sidewall 148 so that a first portion moves to a position adjacent the first filter element 126 and a second portion moves to a position adjacent the second filter element 128. Generally, the first portion of the fluid flows through the first filter element 126 and into the interior chamber 156 to impinge upon the top piston surface 134, flows through the apertures 154 in the piston seat 152, into the annular recess 150 and around to the outlet port 124.

The second portion of the flow passes up through the second filter element 128, but is thereafter blocked by the lower surface 136 of the piston member 132. Upward movement of the piston member 132 away from the seat 152 is prevented by the axial resistance provided by the pressure responsive member 142.

When the filter elements 126, 128 are in a pristine condition (i.e., having substantially no accumulated contaminants), the pressure drop across each of the respective filter elements 126, 128 will be a nominal value (e.g., 1–2 pounds per square inch depending upon the configuration and dimensions of the filter mesh material). Thus, the pressure bearing down upon the top surface 134 of the piston member 132 will nominally equal the pressure pushing up on the bottom surface 136. However, as contaminants are accumulated by the first filter element 126, a pressure differential will begin to develop across the first filter element 126, and the pressure upon the top surface 134 will drop with respect to the pressure upon the bottom surface 136.

The configuration of the pressure responsive member 142 is selected so that when a preselected pressure differential across the first filter element 126 is reached (e.g., 8–10 pounds per square inch), the pressure responsive member 142 collapses, allowing the piston assembly 150 to move upwardly within the interior chamber 156 to the second position as shown in FIG. 3. This causes the fluidic flow to switch over to the second filter element 128. At this switchover point, the upper surface 134 of the piston member 132 substantially blocks further flow of the fluid through the first filter element 126.

Instead, fluid passing through the filter assembly 110 generally passes from the inlet 122, through the second filter element 128 to impinge upon the bottom piston surface 136, through the interior chamber 156, through the apertures 154 in the piston seat 152, into the annular recess 150 and out the outlet port 124.

The set point for the pressure responsive member 142 is preferably selected to correspond to an acceptable accumulated contaminant level within the first filter element 126. Generally, the pressure responsive member should be selected to fail as the first filter element 126 approaches, but does not exceed, its full capacity to capture fluid-borne contaminants. This extends the operational lives of the filter elements and reduces the frequency of filter replacement operations.

The collapse of the pressure responsive member 142 readily provides a visual indication that the first filter element 126 has reached its allotted contaminant level and has been switched out of the system in favor of the second filter element 128. This allows maintenance actions to be taken to replace the first filter element and reset the system in plenty of time before the second filter element 128 reaches a contaminant level that would potentially jeopardize the operation of the main valve 102.

Importantly, it will be noted that the elapsed time during which the filter assembly 110 operates before switching over to the second filter element 128 will substantially depend entirely on the rate at which contaminants are accumulated in the first filter. If the inlet fluid is relatively clean, the accumulation rate in the first element will be low, and the elapsed time to switchover will be relatively long. On the other hand, if the inlet fluid is relatively dirty (i.e., high level of contaminants), the accumulation rate will be accelerated and switchover will occur much more rapidly. The system thus adaptively adjusts to the environment and ensures a preselected filter contaminant level will not be exceeded.

While any number of maintenance rotation schemes could be employed, in one preferred embodiment, upon the occurrence of the switchover point the first filter element 126 is removed, the second filter element 128 is advanced to the first element location and a new, pristine filter element is placed in the second position. This ensures that the filter element in the second location does not slowly accumulate contaminants over time and raise the switchover set point.

In addition to the visual indication provided by the failed pressure responsive member 142, an automated sensing system can additionally be used to indicate that switchover has occurred. As shown in FIGS. 4 and 5, a proximity sensor 158 (such as a Hall effect device) can be mounted to one of the standoffs 146 (FIG. 2) to sense the upward movement of the pin support post 138. The proximity sensor 158 can generate an appropriate input to the monitoring system 116 (FIG. 1), which can include a programmable computer or similar equipment to inform attending personnel of the switchover event.

FIGS. 6 and 7 provide schematic diagrams of the filter assembly 110 in accordance with another preferred construction. Like reference numerals from the embodiment of FIGS. 2 and 3 are used for similar elements in FIGS. 6 and 7.

As before, pressurized fluid enters the inlet port 122 and divides into first and second portions through the first and second filter elements 126, 128. The first portion impinges against the top surface 134 of the piston member 132 and the second portion impinges against the bottom surface 136 of the piston member 132.

Initially, when both filter elements are in a pristine condition the opposing pressures on the piston member 132 will be nominally equal and the pressure responsive member 142 will remain in the uncollapsed state represented in FIG. 6.

Over time, contaminants will tend to accumulate in the first filter element 126 at a faster rate than that in the second filter element 128 due to the respective volumes of fluid passing through the respective elements. As contaminants accumulate in the first filter element 126, the pressure differential will increase until the set point for the pressure responsive member 142 is reached, resulting in the collapse of the member 142 and the switchover to the second filter element 128 as shown in FIG. 7.

While the piston member 132 remains between the first and second filter elements 126, 128, FIGS. 6 and 7 illustrate the fact that the filter elements 126, 128 do not necessarily have to be in an adjacent facing relationship to the opposing sides of the piston member 132, as provided by the embodiment of FIGS. 2 and 3.

Indeed, any number of alternative configurations will readily occur to those skilled in the art whereby an axial load is placed upon the pressure responsive member in relation to the differential pressure across the first filter element. Thus, the disclosed embodiments are illustrative and not limiting to the scope of the claimed invention.

Figure 8:
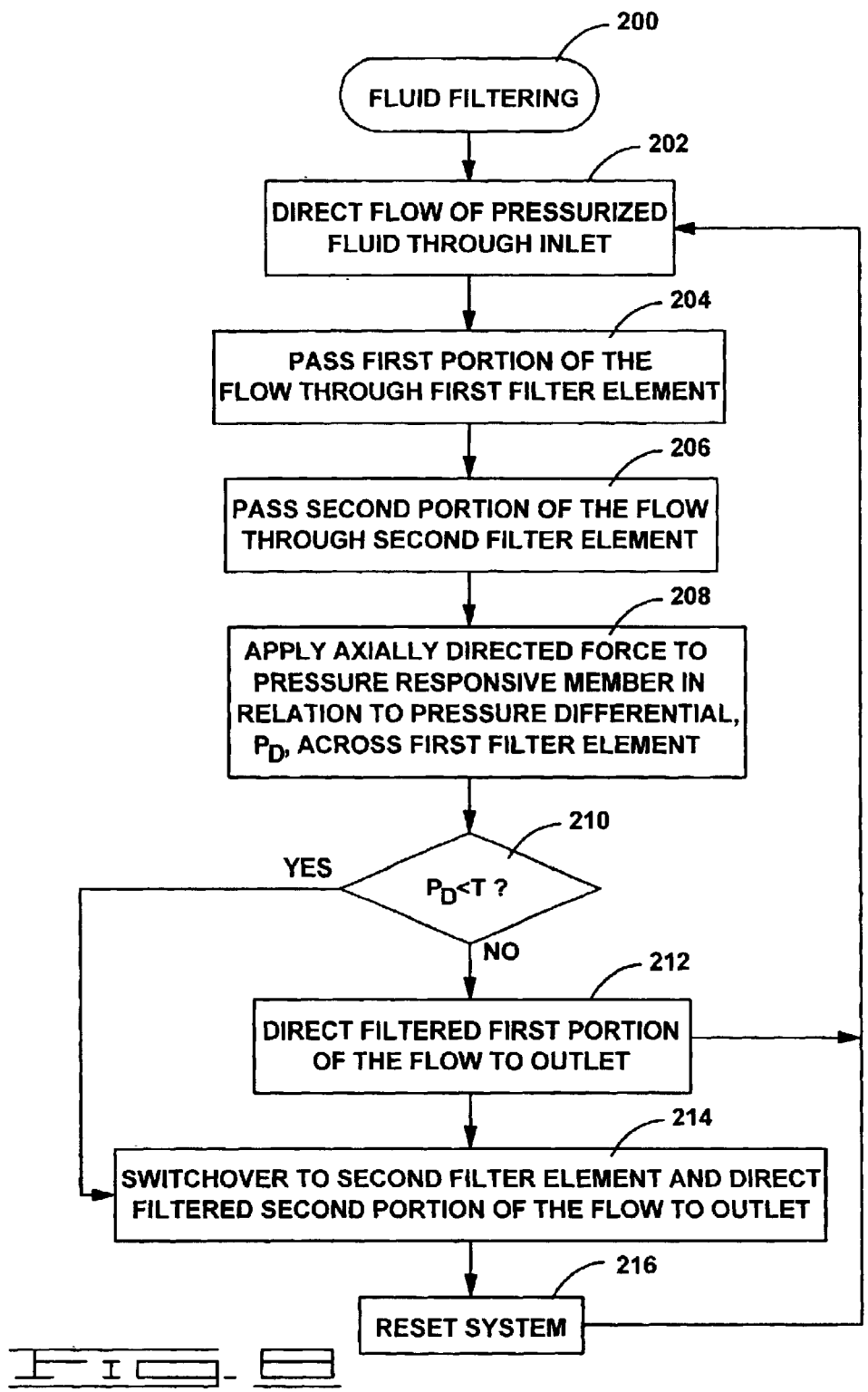
FIG. 8 provides a flow chart for a FLUID FILTERING routine carried out in accordance with preferred embodiments of the present invention to remove fluid-borne contaminants from a pressurized fluid.

FIG. 8 provides a flow chart for a FLUID FILTERING routine 200, generally illustrative of steps carried out in accordance with preferred embodiments of the present invention to filter contaminants from a pressurized fluid.

A flow of the pressurized fluid is initially directed through an inlet at step 202. From there, as shown by steps 204 and 206, a first portion of the flow is passed through a first filter element (such as 126) and a second portion of the flow is passed through a second filter element (such as 128). The filter elements capture fluid-borne contaminants from the respective portions of the flow.

An axially directed force is applied at step 208 to a pressure responsive member (such as 142) in relation to a pressure differential $P_D$ across the first filter element. When the pressure differential $P_D$ is less than a selected force threshold T sufficient to mechanically collapse the pressure responsive member, as shown by decision step 210 the flow passes to step 212 where the filtered first portion of the flow is directed to an outlet.

On the other hand, when the pressure differential $P_D$ exceeds the selected force threshold T, the pressure responsive member collapses and the flow passes to step 214 where the filtered second portion of the flow is directed to the outlet. A 30 visual indication of this switchover is provided by the mechanical collapse of the pressure responsive member. As desired, an electrical signal is further generated during this step (such as by the sensor 158 in FIGS. 4 and 5).

The system is thereafter reset at step 216 which preferably includes the replacement of the first filter element and the replacement of the collapsed pressure responsive member. The routine then returns as shown.

As will now be apparent, the present invention provides a fluid filtering system (assembly and associated methodology) that can be used in a number of different applications to filter fluid-borne contaminants from a pressurized fluid, such as a fuel line, a pilot line for a pressure relief system, etc. The system provides several important advantages over the prior art.

First, the system adaptively responds to current contamination levels in the fluid without the need for separate, expensive sensing devices. Regardless whether the contaminant level is low or high, or varies widely over time, the system will trigger the switchover to the second filter when the accumulated amount of captured contaminants in the first filter element reaches a given level. This substantially eliminates the possibility that a filter element will become filled to capacity with accumulated contaminants and operate at reduced filtering effectiveness.

Also, the switchover event is readily displayed (visually and/or electronically), allowing attending personnel plenty of time to schedule the changing out of the dirty filter element while the second filter element remains online. Moreover, the system is substantially impervious to wide variations in the pressure of the fluid. Thus, large swings in the overall pressure of the fluid will not substantially affect the differential pressure across the first filter element.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the filter assembly without departing from the spirit and scope of the present invention.

In addition, although the embodiments described herein are generally directed to the filtering of contaminants in a fluid used in a pressure relief system, it will be appreciated by those skilled in the art that the plenum assembly can be used for other types of pressurized fluid systems without departing from the spirit and scope of the claimed invention.

What is claimed is:

1. A method for filtering contaminants from a pressurized fluid, comprising:
   directing a flow of the pressurized fluid through an inlet;
   passing a first portion of the flow from the inlet to a first filter element which captures fluid-borne contaminants from said first portion;
   applying an axially directed force to a collapsible pressure responsive member in relation to a pressure differential across the first filter element, said pressure differential determined in relation to an accumulated amount of the contaminants captured by the first filter element; and
   switching to a second filter-element which captures fluid-borne contaminants from a second portion of the flow from the inlet when the axially directed force reaches a level sufficient to mechanically collapse the pressure responsive member.

2. The method of claim 1, wherein the pressure responsive member of the applying and switching steps comprises a buckling pin.

3. The method of claim 1, further comprising directing the first portion of the flow from the first filter element to an outlet prior to the mechanical collapse of the pressure responsive member, and subsequently directing the second portion of the flow from the second filter element to the outlet upon the mechanical collapse of the pressure responsive member.

4. The method of claim 1, further comprising providing a piston member with opposing first and second piston surfaces, the piston member coupled to the pressure responsive member of the applying and switching steps.

5. The method of claim 4, wherein the passing step further comprises concurrently passing the second portion of the flow through the second filter element, directing the first portion of the flow from the first filter element to impinge upon the first piston surface, and directing the second portion of the flow from the second filter element to impinge upon the second piston surface so that opposing pressure applied to the respective first and second piston surfaces are provided in relation to the pressure differential across the first filter element.

6. The method of claim 1, further comprising generating an electrical signal indicative of the collapse of the pressure responsive member during the switching step.

7. The method of claim 1, further comprising replacing the first filter element with a replacement first filter element and replacing the collapsed pressure responsive member with a replacement pressure responsive member after the switching step, and repeating the directing, passing and applying steps using the replacement first filter element and the replacement pressure responsive member.

8. A filter assembly which filters contaminants from a pressurized fluid, comprising:
   an inlet which receives a flow of the pressurized fluid;
   a first filter element through which a first portion of the flow from the inlet passes, the first filter element capturing fluid-borne contaminants from said first portion;
   a second filter element configured to receive a second portion of the flow from the inlet, wherein the second filter element captures fluid-borne contaminants from the second portion when said second portion flow through the second filter element; and
   a collapsible pressure responsive member coupled to receive an axially directed force in relation to a pressure differential across the first filter element as the first portion of the flow passes therethrough, said pressure differential determined in relation to an accumulate amount of the contaminants captured by the first filter element,
   wherein the first portion of the flow passes from the first filter element to an outlet while the pressure differential across the first filter element is insufficient to collapse the pressure responsive member, and wherein the second filter element is subsequently switched in so that the second portion of the flow passes from the second filter element to the outlet upon collapse of the pressure responsive member.

9. The filter assembly of claim 8, wherein the pressure responsive member comprises a buckling pin.

10. The filter assembly of claim 8, further comprising a piston member with opposing first and second piston surfaces, the piston member coupled to the pressure responsive member.

11. The filter assembly of claim 10, wherein the first and second portions of the flow are concurrently pass from the respective first and second filter elements to the piston member so that the first portion of the flow impinges upon the first piston surface and the second portion of the flow impinges upon the second piston surface.

12. The filter assembly of claim 11, further comprising a housing in which the piston member and the first and second filter elements are disposed, wherein the first filter element is disposed in an adjacent facing relationship to the first piston surface and wherein the second filter element is disposed in an adjacent facing relationship to the second piston surface.

13. The filter assembly of claim 11, in conjunction with a pressure relief system comprising a main pressure relief valve operated by a pilot valve, wherein the filter assembly provides filter pressurized fluid to the pilot valve.

* * * * *